United States Patent [19]

Gamperl

[11] Patent Number: 5,029,470
[45] Date of Patent: Jul. 9, 1991

[54] DEVICE FOR MEASURING OR METERING AND REGULATING THE MASS OF A FLOW OF GAS

[75] Inventor: Leonard Gamperl, Norting, Fed. Rep. of Germany

[73] Assignee: Wigha Elektronische Messtechnik GmbH, Fed. Rep. of Germany

[21] Appl. No.: 367,561

[22] Filed: Jun. 19, 1989

[51] Int. Cl.$^5$ .............................................. G01F 5/00
[52] U.S. Cl. .................................. 73/203; 137/599.1; 137/625.32
[58] Field of Search ...................... 73/202, 202.5, 203; 137/625.32, 625.29, 599.1

[56] References Cited

U.S. PATENT DOCUMENTS

| | | | |
|---|---|---|---|
| 3,013,432 | 12/1961 | O'Keeffe | 73/203 |
| 3,581,996 | 6/1971 | Boyer | 137/625.32 |
| 4,450,718 | 5/1984 | Harteminit | 73/202 |
| 4,524,616 | 6/1985 | Drelel | 73/203 |

*Primary Examiner*—Herbert Goldstein
*Attorney, Agent, or Firm*—Jones, Askew & Lunsford

[57] ABSTRACT

The invention pertains to a device for measuring and regulating the mass of a flow of gases by means of a bypass system with a sensor capillary element, a regulating valve, and an electronic component for elucidating and evaluating measurements received from the sensor element for controlling the regulating valve, and with a basic body of metal, which has a gas flow-through conduit connected to a threaded inlet and a threaded outlet, while two channels leading to and from the sensor element branch off from the gas flow-through conduit. The regulating valve has access to the gas flow-through conduit, and a bypass unit is positioned between the sensor channels and the entrance for the regulating valve, characterized by the facts that the gas flow-through conduit (6) is traversed by a blind bypass bore (7), while the sensor channels (13 and 14) open, in the vicinity of the inlet aperture (10) of the gas flow-through conduit (6), into the bypass bore (7) and, in the vicinity of the outlet aperture (11) of the gas flow-through conduit (6), out of the bypass bore (7), and that a bypass cylinder with sliding seat is located in the blind bypass bore (7), while this sliding seat is designed so that a free space, preferably a fissure, through which the gas can flow, remains between the jacket surface of the bypass cylinder and the inner surface of the blind bypass bore (7).

24 Claims, 2 Drawing Sheets

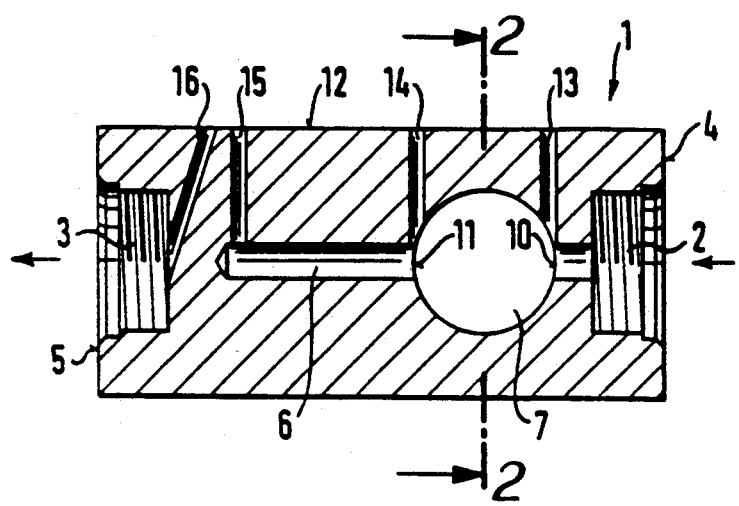
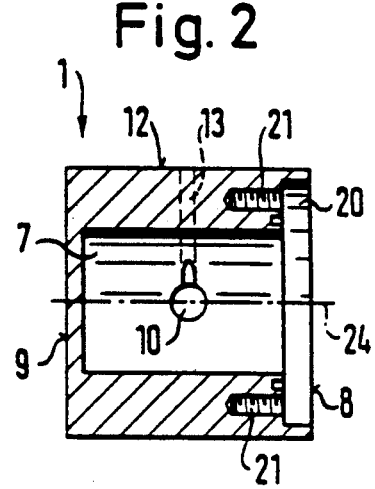
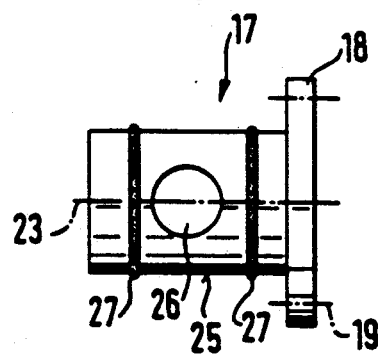
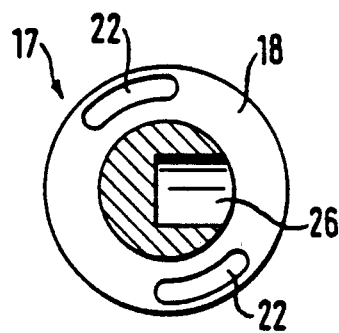

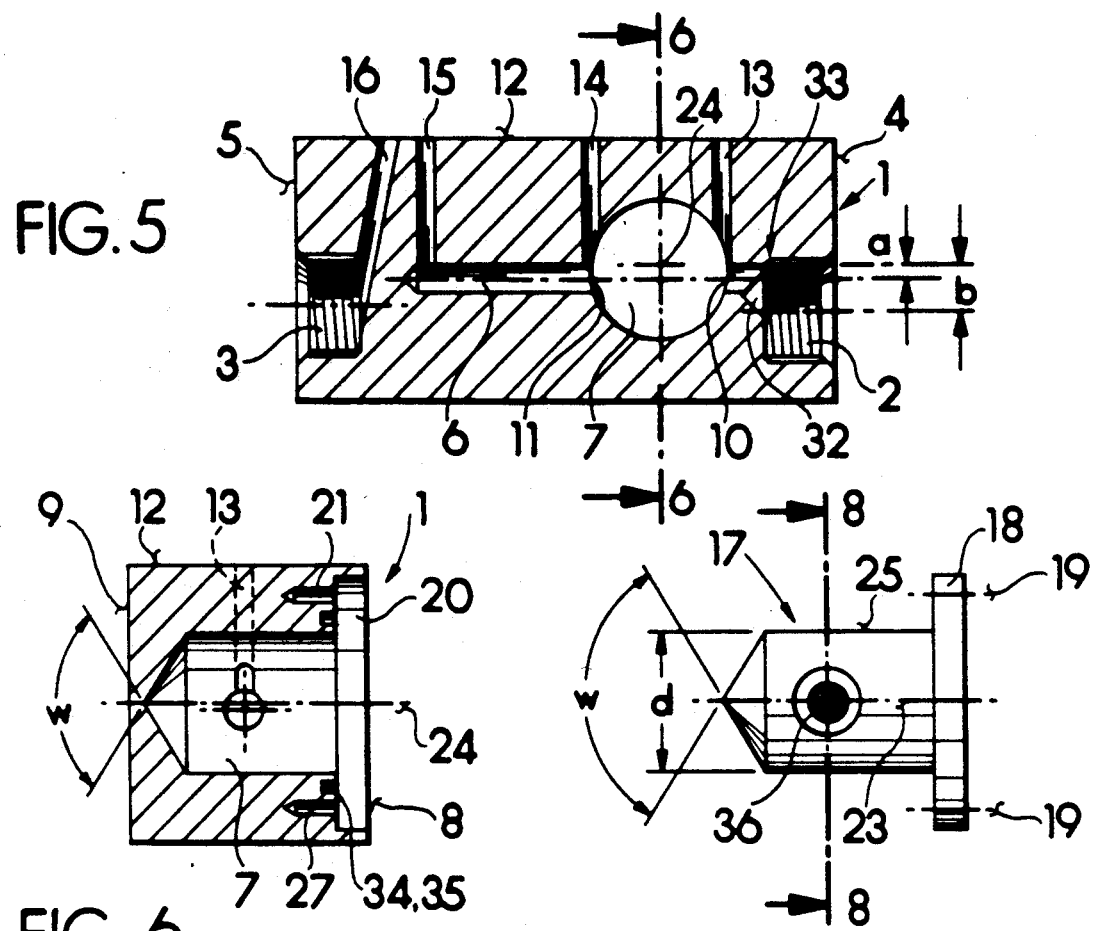
FIG. 5
FIG. 6
FIG. 7
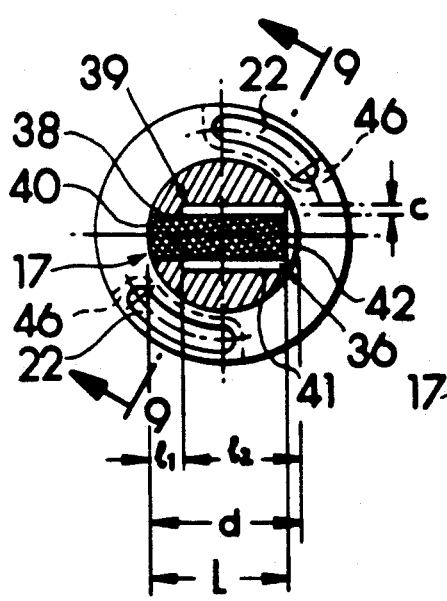
FIG. 8
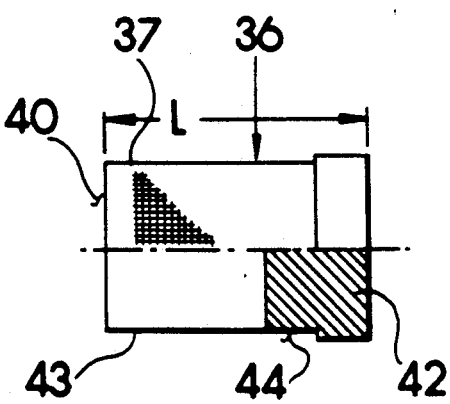
FIG. 9
FIG. 10

DEVICE FOR MEASURING OR METERING AND REGULATING THE MASS OF A FLOW OF GAS

The invention pertains to a device for measuring and regulating the mass of a flow of gas.

Such gas-flow measurement and control devices measure and regulate the mass of a flow of gases through a bypass system, in which a partial flow is directed through a sensor capillary. Coordinated with the sensor capillary and spaced on the outside thereof are two resistance thermometers. By means of a bridge circuit, the temperature differential between the two thermometers is elucidated and converted into a signal, which registers a proportional value of the quantitative flow. In the case of regulation of the gas flow, e.g., constant regulation, the signal is utilized to control a regulating valve situated in the gas flow. This control is ensured by means of an electrical component with a printed circuit, which also contains the sensor element.

The measurement device has a basic cuboidal body of stainless steel. Extending from the front side to the other side of the basic body is a gas flow-through conduit, while threaded inlets and outlets for attaching gas lines are provided in the vicinity of these sides. Inside the gas flow-through conduit is a bypass unit. In front of, and behind, the bypass unit in the direction of the gas flow, a small sensor bore branches off perpendicularly and leads to the upper side of the basic body, through the wall of which these bores pass to connect with the sensor capillary. Behind the second, or rear sensor bore in the direction of the gas flow, a larger valve bore passes through the wall of the basic body and opens perpendicularly into the gas flow-through conduit. The valve bore, in which the regulating valve is situated, preferably extends parallel to the sensor bores in the same wall of the basic body.

The bypass unit should separate the flow of gas into a main flow and into a smaller, partial flow. The main flow traverses the basic body. The partial flow passes through the front sensor bore, makes its way into the sensor capillary, and proceeds via the rear sensor bore back into the main flow in advance of the regulating valve.

In the previously known devices, the bypass unit consists of a threaded sleeve and, mounted inside this sleeve, a porous metal cylinder with a base. The porosity and size of the metal cylinder provide a means for measuring the partial quantity of the gas flow diverted through the sensor capillary. Accordingly, the bypass unit must also be exchanged when the partial quantity is altered. This exchange is time-consuming and requires the maintenance of an extensive stock of exchange parts. Furthermore, the porosity varies from one metal cylinder to another. In addition, the bypass unit consists of relatively costly individual parts.

The objective of the invention is the creation of a bypass unit of simple construction, which is readily exchangeable and, optionally, adjustable for various quantitative flow rates.

With references to the appended drawings, and by way of several embodiment examples, the invention is illustratively described in greater detail below. The drawings depict:

FIG. 1, a longitudinal cross section through the basic body.

FIG. 2, a cross section along line A-A in FIG. 1.

FIG. 3, a side view of the bypass cylinder.

FIG. 4, a cross section through the bypass cylinder.

FIG. 5, a longitudinal cross section, as in FIG. 1, through a modified basic body.

FIG. 6, a cross section VI—VI in FIG. 5.

FIG. 7, a side view of a bypass cylinder in modified form as preferably used for the basic body depicted in FIG. 5.

FIG. 8, a cross section VIII—VIII in FIG. 7.

FIG. 9, a cross section IX—IX in FIG. 8.

FIG. 10, in cross section and on a larger scale, a flow-through element for the bypass cylinder illustrated in FIGS. 7 and 8.

The basic body (1) in the form of a cuboid with flat outer surfaces is made of metal and has an ordinary gas inlet connection (2) in the vicinity of the front side (4) of the basic body (1) and an ordinary gas outlet connection (3) in the vicinity of the backside (5) of the basic body (1). Extending centrally from the gas inlet connection (2) to a point just short of the gas outlet connection (3) is a blind gas bore (6). This blind gas bore (6) is traversed by a blind bypass bore (7) of greater diameter, which extends from the one long side (8) toward the other long side (9) of the basic body (1) and terminates with a slight separation from the surface of the long side (9). In the area of the inlet aperture (10) of the blind gas bore (6) into the blind bypass bore (7), as well as in the area of the outlet aperture (11) of blind gas bore (6) from the blind bypass bore (7), a sensor bore (13 and 14) extends perpendicularly upward to the surface (12) of the basic body (1). The diameter of the sensor bores (13 and 14) is smaller than the diameter of the blind gas bore (6).

At the end of the blind bore (6) another gas flow bore (15) extending to the surface (12) of the basic body (1) is provided, the diameter of which approximates that of the sensor bores (13 and 14). Alongside this gas flow bore (15), is yet another gas flow bore (16), which leads from the surface (12) of the basic body (1) to the gas outlet (3) on the back side.

For practical reasons, the blind bypass bore (7) is provided with an annular flange depression (20), from the annular surface of which several threaded bores (21) extend into the wall of the basic body(1).

The sensor bores (13 and 14) connect to a sensor capillary (not illustrated) and the gas flow bores (15, 16) connect to the regulating valve (not illustrated). Also not illustrated are the electronic components, which compare with ordinary elements of this kind. A metering unit (not illustrated) including the sensor capillary and the regulating valve can be installed on the upper side (12) of the basic body (1). In case only the massive gas flow is to be measured, the gas flow bores (15 and 16) can be short circuited by means of an added component with a suitable conduit.

In keeping with the invention, a bypass cylinder (17) is situated in the blind bypass bore (7) with a sliding seat, which is designed so that the main flow of the gas is distributed in a laminar stream over the jacket surface of the bypass cylinder (17), while the partial flow branches off via the aperture of the sensor bore (13), passes through the sensor capillary (not illustrated), and returns via the sensor bore (14) to the main flow in the blind gas bore (6).

The bypass cylinder (17) has a flange ring (18) with screw holes (19). It fits positively in the annular flange depression (20), while screws ensure its proper seating.

In a special configuration of the invention, the flange ring (18)—as depicted in FIG. 4—has curved longitudinal holes (22), so that the bypass cylinder (17) can be rotated on its longitudinal axis (23) and secured in various rotated positions. In connection therewith, provision can be made for the bypass cylinder (17) when, e.g., it is out of round or when its longitudinal axis (23) does not coincide with the longitudinal axis (24) of the blind bypass bore(7), so that rotation of the bypass cylinder (17) on its longitudinal axis (23) causes the volume of the fissure of the sliding seat between the blind bypass bore (7) and the jacket surface (25) of the bypass cylinder (18) to expand or contract. This results in various quantitative flow rates and provides a possibility for regulation of the device.

In another modification of [the device of] the invention, provision can be made, in conjunction with the rotary design of the bypass cylinder (17), that said bypass cylinder (17) have a blind bore (26) extending transversely across the longitudinal extension of said bypass cylinder. When the mouth of this blind bore (26) is aligned more or less in the gas flow, a comparable quantitative flow rate of the gas results.

In yet another configuration of the invention, a bore passing entirely through the bypass cylinder (17) is provided instead of the blind bore (26).

The seal of the flange ring (18) with the blind bypass bore (7), or the sliding seat and the parallel guiding of the bypass cylinder (17) are accomplished in a practical manner by way of O-rings (27), which are mounted alongside the blind bore (6) in annular grooves on the bypass cylinder (17).

The advantages of the invention are extraordinary. Exchange of the bypass cylinder is very simple. The entire bypass system is of very simple construction and is easy to produce. The bypass unit can be regulated by rotating the bypass cylinder on its longitudinal axis.

The basic body can be made shorter than that of the devices known heretofore, since the bypass unit does not require as much space as the previously known devices. It is no longer necessary to provide threaded bores in the blind gas flow bore. Altogether, the result is a basic body, which is unusually easy to produce, ensures uncomplicated exchange of the bypass unit, is easy to clean, and effects a very dependable separation of the partial gas flows. The fact that turbulence in the partial gas flow can be eliminated is highly significant. This is specifically ensured by the annular fissure between the surface of the bypass cylinder and the surface of the blind bypass bore. The result is the obtainment of an adequately uniform flow rate in both the main and the partial flows.

The design depicted in FIG. 5, in which identical parts bear the same reference symbols, is distinguished from the design in FIG. 1 by the following characteristics. On the one hand, the blind gas bore (6) is offset downward from the midaxis (24) of the blind bypass bore (7) by a distance (a). This results in a division of the gas flow favoring the partial flow not passing through the sensor bores (13 and 14). For measuring the mass of the gas flow, only a relatively small quantity of the gas flow is diverted, which is sufficient for measurement, and consequently, the unillustrated metering element can be made smaller and more cost-efficient, since its required performance level is lower.

Furthermore, the gas inlet and outlet connections (2 and 3) are offset downward in relation to the midaxis (24) of the bypass bore (7) by a distance (b), which is greater than the distance (a), so that the openings of the blind gas bore (7) [sic (6)] and the gas-flow bore (16) are offset upwards in relation to the gas inlet and outlet connections (2 and 3). The result is an improvement of the connection situation regarding the utilization of space. In the interest of improving the flow at the transition between the gas inlet connection (2) and the blind gas bore (6), an oblique channel (32) or depression can be provided, which extends inside the base of the gas inlet connection (2) obliquely upward from the middle thereof to the blind gas bore (6). It is also advantageous to incorporate a sieve in the vicinity of the gas inlet connection (2) in order to capture any impurities prior to the division of the gas flow in the vicinity of the bypass cylinder (10). Preferably, a flat sieve (33) is used, the circumference and rounded periphery of which are matched to the gas inlet connection (2), and which is mounted at the base of said gas inlet connection (2).

In the design depicted in FIG. 3, the U-ring (27) remote from the flange ring (18) is provided for the purpose of preventing a flow of gas between the face of the bypass cylinder (17) and the base of the blind bypass bore (7), since a flow at this point, due to turbulence, agitates and thus impedes the gas flow in the vicinity of the bypass cylinder (17). The U-ring (27) and an annular receiver groove therefore can be dispensed with, when, as shown in FIGS. 6 and 7, either the base of the blind bypass bore (7) or the face of the bypass cylinder (17), preferably both, is/are tapered. The angle (w) of taper is preferably about 120°. Due to this convex and concave configuration of the face of the bypass cylinder (17) and the base of the bypass bore (7), there is a uniform flow in the fissure formed between them. On the side facing the flange ring (18), a U-ring (27) can be provided in an annular groove in the jacket surface of the bypass cylinder (17), or, alternatively, an O-ring (34) can be provided, which is seated in an annular groove (35) in the lateral surface of the flange-ring depression (20) and in concentric orientation on the blind bypass bore (7) (see FIG. 6).

When the bypass cylinder (17) is provided with a transverse passageway for the main gas flow, it is advantageous to provide a flow-through element in the vicinity of this transverse bore, which contributes to a quieting of the agitation of the main flow. Such a flow-through element can be formed as a meshed, porous, or perforated element. In the embodiment example illustrated in FIGS. 7, 8, and 10, the flow-through element is designed as a pot-like sieve (36), the free periphery (37) which is inserted into the constricted stage (38) of the transverse bore (39) is designed as a staged bore. The wall of the enlarged stage (41) of the transverse bore (39) then has an annular separation (c) from the free periphery of the sieve (36). The length (l1) of the constricted stage (38) is only a part of the length (l2) of the enlarged stage (41), while the length (L) of the sieve (36) is only minimally smaller than the diameter (d) of the bypass cylinder (17). Consequently, the sieve (36) has a large surface and therefore a great cross-sectional flow rate, as a result of which a great main flow is facilitated. On the side (40), the pot-like sieve (36) is open. At the other end, remote from the constricted stage (38), the pot-like sieve (36) has a base partition, which is preferably formed by an impenetrable baseplate (42). Ideally, the baseplate (42) has a step at its peripheral surface, while the annular wall (43) of the sieve (36), when positioned on the shoulder of the step, rests on and is affixed to, preferably by soldering, welding, or cementing, the constricted stage (44). An economical production process to form sieve (36) consists of bending a rectangular piece of material into a hollow cylinder, so that the approaching ends overlap and can be joined together, also preferably by soldering, welding, or cementing. The affixing of the free rim (37) of the sieve (36) in the constricted stage (38) can be accomplished in the same manner.

By means of the flow-through element, in keeping with the invention, on the one hand the main flow in the transverse channel is slowed, made uniform or quieted, and stabilized; while on the other hand, the flow rates of the main flow and the partial flow are approximately, or preferably exactly, and equalized. As a result, the flow in its totality is made uniform, quieted, and stabilized, so that, with an essentially laminar flow in the gas conduit, sufficiently accurate measurement results can be attained.

With this embodiment example, it is also possible, by rotating the bypass cylinder (17), to adjust for quantitatively different flow rates of the main flow(s) or of the partial flow. In so doing, the transverse bore (39) can be aligned opposite the gas inlet connection (2) with its constricted stage (38) or with its enlarged stage (41).

Like the basic body (1) and the bypass cylinder (17), the sieve (36) is preferably made of a corrosion-resistant metal, such as stainless steel.

As may be seen in FIGS. 8 and 9, the flange ring (18) has, in the outer area of the curved longitudinal holes (22), comparably undercut depressions (46), so that the heads of the unillustrated screws can be slightly countersunk and do not protrude unnecessarily from the flange ring (18) in its installed position.

I claim:

1. A device for measuring the mass of a flow of gas by means of a bypass system, comprising:
   a body (1) having a gas inlet (2) and a gas outlet (3) and a gas flow-through conduit (6) connected to the inlet and outlet;
   two sensor channels (13, 14) branching off from the flow-through conduit;
   a blind bypass bore (7) traversing the flow-through conduit so that the flowthrough conduit on the gas inlet side forms an inlet aperture (10) to the bypass bore and on the gas outlet side forms an outlet aperture (11) from the bypass bore;
   one sensor channel (13) opening into the bypass bore in the vicinity of the inlet aperture and the other sensor channel (14) opening into the bypass bore in the vicinity of the outlet aperture; and
   a bypass cylinder (17) located in the bypass bore so as to define a free space between the surface of the bypass cylinder and the inner surface of the bypass bore,
   so that gas can flow through the free space while flowing between the gas inlet and gas outlet.

2. Device according to claim 1, wherein the bypass cylinder (17) is rotatable on its longitudinal axis within the blind bypass bore (7), and the longitudinal axis (23) of the bypass cylinder (17) does not coincide with the longitudinal axis (24) of the blind bypass bore (7), so that rotation of the bypass cylinder varies the flow rate of gas flowing through the free space.

3. Device according to claim 1, wherein the bypass cylinder (17) has a blind bore (26) extending transversely to the longitudinal extension of said bypass cylinder.

4. Device according to claim 3, wherein the longitudinal axis of the blind bore (26) coincides with the longitudinal axis of the gas flow-through conduit (6).

5. Device according to claim 1, wherein the bypass cylinder (17) has a transverse bore (29) passing entirely through said bypass cylinder.

6. Device according to claim 5, wherein the longitudinal axis of the transverse bore coincides with the longitudinal axis of the gas flow-through conduit (6).

7. Device according to claim 5, wherein a porous flow-through element (36) for a partial gas flow is situated in the transverse bore (39).

8. Device according to claim 7, wherein the flow-through element comprises a sieve (36).

9. Device according to claim 8, wherein the transverse bore (39) narrows in stages, and the sieve (36) is of pot-like design, and the sieve (36) has a free rim (37) inserted into and affixed in a constricted part (38) of the transverse bore (39).

10. Device according to claim 9, wherein the pot-like sieve (36) has a base formed as a round plate (42).

11. Device according to claim 10, wherein the sieve (36) is formed from a rectangular piece of material which is bent into a rounded configuration and rests on the jacket surface of the round plate (42), while its ends overlap and are joined together.

12. Device according to claim 9, wherein the length ($l_1$) of the constricted part (38) of the transverse bore (39) represents only a fraction of the diameter (d) of the bypass cylinder (17), and the length (L) of the sieve (36) is dimensioned so as to be slightly less than the diameter (d) of the bypass cylinder (17).

13. Device according to claim 1, further comprising an O-ring (27) seated in an annular groove on the bypass cylinder (17) in each side of the inlet aperture and outlet aperture.

14. Device according to claim 1, wherein the blind bypass bore (7) is provided with a flange-ring depression (20) and the bypass cylinder (17) has a flange ring (18) which fits positively in the flange-ring depression (20), and a screw connection between the flange ring (18) and the flange-ring depression (20) is provided for securing the bypass cylinder (17).

15. Device according to claim 14, wherein curved longitudinal holes (22) are provided in the flange ring (18) for the screw connection.

16. Device according to claim 14, further comprising an annular groove (34) for a gasket ring (35) provided in the side surface of the flange-ring depression (20).

17. Device according to claim 1, wherein the gas flow-through conduit (6) is a blind bore; a channel (15) opens at the end of the blind bore and passes through the body (1); and a second channel (16) is provided in addition to the channel (15), which leads from the surface of the body (1) to the gas outlet (3) of the body (1), whereby the two channels (15 and 16) can be joined with a regulating valve.

18. Device according to claim 1, wherein the diameter of the blind bypass bore (7) is greater than the diameter of the gas flowthrough conduit (6).

19. Device according to claim 18, wherein the sensor channels (13 and 14) are bores of the same diameter, and this diameter is less than the diameter of the bore of the gas flow-through conduit (6).

20. Device according to claim 1, wherein at least one of the base of the blind bypass bore (7) and the surface of the bypass cylinder (17) facing this base are respectively concave and convex, ensuring a sliding play by a space between them.

21. Device according to claim 20, wherein the base and the opposing surface are coniform.

22. Device according to claim 21, wherein the angel (w) of taper is approximately 120°.

23. Device according to claim 1, wherein a diametrical transverse bore (39) is provided in the bypass cylinder (17); and the longitudinal axis of the gas flow-through conduit (6), in relation to the longitudinal axis (24) of the blind bypass bore (7), is offset toward the side remote from the sensor channels (13 and 14) by a distance (a).

24. Device according to claim 1, wherein the bypass cylinder is rotatable on its longitudinal axis within the blind bypass bore, and the bypass cylinder is out of round with its longitudinal axis, so that rotation of the bypass cylinder varies the flow rate of the gas flowing through the free space.

* * * * *

UNITED STATES PATENT AND TRADEMARK OFFICE
CERTIFICATE OF CORRECTION

PATENT NO. : 5,029,470

DATED : July 9, 1991

INVENTOR(S) : LEONARD GAMPERL

It is certified that error appears in the above-identified patent and that said Letters Patent is hereby corrected as shown below:

Column 1, line 67, change "A-A" to --2-2--.

Column 7, line 1, change "angel" to --angle--.

Signed and Sealed this

Twenty-second Day of December, 1992

Attest:

DOUGLAS B. COMER

*Attesting Officer*   Acting Commissioner of Patents and Trademarks